United States Patent [19]

Obara

[11] Patent Number: 4,990,737
[45] Date of Patent: Feb. 5, 1991

[54] INITIAL HOLE MACHINING DEVICE FOR A WIRE-CUT ELECTRIC DISCHARGE MACHINE

[75] Inventor: Haruki Obara, Toyama, Japan
[73] Assignee: Fanuc Ltd, Minamitsuru, Japan
[21] Appl. No.: 391,569
[22] PCT Filed: Jan. 30, 1989
[86] PCT No.: PCT/JP89/00089
§ 371 Date: Jul. 5, 1989
§ 102(e) Date: Jul. 5, 1989
[87] PCT Pub. No.: WO89/07033
PCT Pub. Date: Aug. 10, 1989

[30] Foreign Application Priority Data

Feb. 8, 1988 [JP] Japan .................................. 63-25747

[51] Int. Cl.⁵ .................... B23H 7/02; B23H 7/10; B23H 9/14
[52] U.S. Cl. .................... 219/69.11; 219/69.12
[58] Field of Search ................. 219/69.11, 69.12, 69.15

[56] References Cited

U.S. PATENT DOCUMENTS 4,598,189 7/1986 Inoue et al. ................. 219/69.17
4,711,981 12/1987 Aso et al. ................... 219/69.12

FOREIGN PATENT DOCUMENTS 51-47681 4/1976 Japan .
58-51018 3/1983 Japan ...................... 219/69.15
60-131121 3/1985 Japan .
61-19517 1/1986 Japan ...................... 219/69.15
87-01635 3/1987 PCT Int'l Appl. ........... 219/69.12

Primary Examiner—Geoffrey S. Evans
Attorney, Agent, or Firm—Staas & Halsey

[57] ABSTRACT

An initial hole machining device for a wire-cut electric discharge machine, which is capable of efficiently performing initial hole machining over the entire electric discharge machinable region determined by the mechanical structure of the electric discharge machine, without the need of shifting a machine coordinate system or correcting position command data and of providing a separate machining liquid feed device. The initial hole machining device has a body removably fitted in a nozzle hole of an upper wire guide of the electric discharge machine for movement between an initial hole machining position where it is fitted in the nozzle hole and a set-aside position where it is spaced from the upper wire guide. A pipe electrode for initial hole machining is mounted to the body coaxially with a wire electrode. After setting in any desired position within the machinable region by using the machine coordinate system and the position command data common to those for ordinary electric discharge machining, the pipe electrode, electrically connected to an electric discharge machining power supply through a connecting route having a small inductance, is moved toward a workpiece, so as to produce an electric discharge between the pipe electrode and the workpiece to form an initial hole, with a machining liquid supplied through the nozzle hole and a machining liquid passage of the body communicated therewith.

4 Claims, 2 Drawing Sheets

INITIAL HOLE MACHINING DEVICE FOR A WIRE-CUT ELECTRIC DISCHARGE MACHINE

BACKGROUND OF THE INVENTION

The present invention relates to an initial hole machining device for a wire-cut electric discharge machine.

In wire-cut electric discharge machining, a wire electrode is first inserted through an initial hole bored through a workpiece before the electric discharge machining process is started. The initial hole is conventionally formed by using a drill, for example. With the use of a drill, however, it is difficult to make an initial hole, particularly a small-diameter hole, in a workpiece which has been heat-treated to have high hardness. Conventionally, therefore, an initial hole machining device utilizing the electric discharge machining power supply of a wire-cut electric discharge machine is used for boring an initial hole by elecrical discharge machining. This type of initial hole machining device typically includes a pipe electrode for initial hole machining which is connected to the electric discharge machining power supply of the wire-cut electric discharge machine by a lead wire. The pipe electrode is arranged in a position horizontally offset from the upper wire guide of the electric discharge machine.

In an initial hole machining process, after a table carrying a workpiece thereon is moved horizontally to set the workpiece in a desired initial hole-machining position, an electrical discharge is produced between the workpiece and the pipe electrode, simultaneously supplying a machining liquid through an initial hole-machining nozzle which is separate from an electric discharge machining nozzle of the upper wire guide, thereby making an initial hole. During a normal electric discharge machining process, on the other hand, the table is moved horizontally to cause the workpiece to move relative to the wire electrode in accordance with a predetermined machining locus while the machining liquid is supplied through the nozzle of the upper wire guide and an electrical discharge is produced between the workpiece and the wire electrode, thereby machining the workpiece.

In such a conventional initial hole machining device in which the pipe electrode is located in a position offset from the wire electrode, the initial hole machinable region is shifted from the electric discharge machinable region by the offset amount. Accordingly, there is a dead zone where only one of the discharge machining process and the initial hole machining process is feasible but the other cannot be carried out. Moreover, to perform the initial hole machining, either the position command data for table position control representing a position to be machined or the machine coordinate system set in the electric discharge machine must be corrected in accordance with the offset amount. In addition, the lead wire connecting between the pipe electrode and the electric discharge machining power supply causes an increase of the inductance of the initial hole machining power supply system, thus deteriorating the characteristics of the electric discharge machining power supply.

SUMMARY OF THE INVENTION

An object of the present invention is to provide an initial hole machining device for a wire-cut electric discharge machine in which both an initial hole machining process and an electric discharge machining process can be performed over the entire electric discharge machinable region which is determined by the mechanical structure of the wire-cut electric discharge machine.

Another object of the invention is to provide an initial hole machining device for a wire-cut electric discharge machine in which the initial hole machining process and the electric discharge machining process are feasible in the same machining position and accordingly it is unnecessary to shift the machine coordinate system or correct the position command data between the initial hole machining process and the electric discharge machining process.

Still another object of the invention is to provide an initial hole machining device for a wire-cut electric discharge machine in which, when the initial hole machining process is performed with an electric discharge produced between an initial hole machining electrode and a workpiece, the electric discharge machining power supply of the wore-cut electric discharge machine can be utilized without the degradation of its characteristics, and accordingly which is capable of efficient initial hole machining.

A further object of the invention is to provide an initial hole machining device for a wire-cut electric discharge machine which does not require a machining liquid feed means adapted exclusively for the initial hole machining process.

In order to achieve the aforementioned objects, according to the present invention, an initial hole machining device for use in a wire-cut electric discharge machine having a wire guide for guiding a wire electrode, comprises a body detachably mounted to the wire guide, an initial hole machining electrode, and mounting means for mounting the initial hole machining electrode to the body such that the initial hole machining electrode is coaxial with the wire electrode.

Preferably, the initial hole machining device further comprises means for electrically connecting the initial hole machining electrode to an electric discharge machining power supply of the electric discharge machine, the means having a small inductance. Further, the body of the initial hole machining device is detachably fitted in a nozzle hole of a machining liquid-supply nozzle portion of the wire guide and has a machining liquid passage communicating with the nozzle hole.

As mentioned above, according to the present invention, since the initial hole machining electrode is disposed coaxially with the wire electrode, an initial hole machining process can be performed at an arbitrary part of the electric discharge machinable region which is determined by the mechanical structure of the electric discharge machine. In addition, since a machining position for execution of the initial hole machining process is the same as a machining position for ordinary electric discharge machining, it is sufficient to provide the position command data in a machine coordinate system which is common to that for ordinary electric discharge machining, without the need of transforming the machine coordinate system or correcting the position command date upon execution of initial hole machining. Moreover, since electric power is supplied from the electric discharge machining power supply to the initial hole machining electrode through the connecting means having a small inductance, efficient initial hole machining can be achieved, without the degradation of characteristics of the power supply. Further, since machining liquid is supplied to the electric discharge machining region through a machining liquid passage which is formed in the body of the initial hole machining device and is communicated with the nozzle hole of the wire guide, no machining liquid feed means adapted exclusively for the initial hole machining process is required.

DSESCRIPTION OF THE PREFERRED EMBODIMENTS

Figure 2:
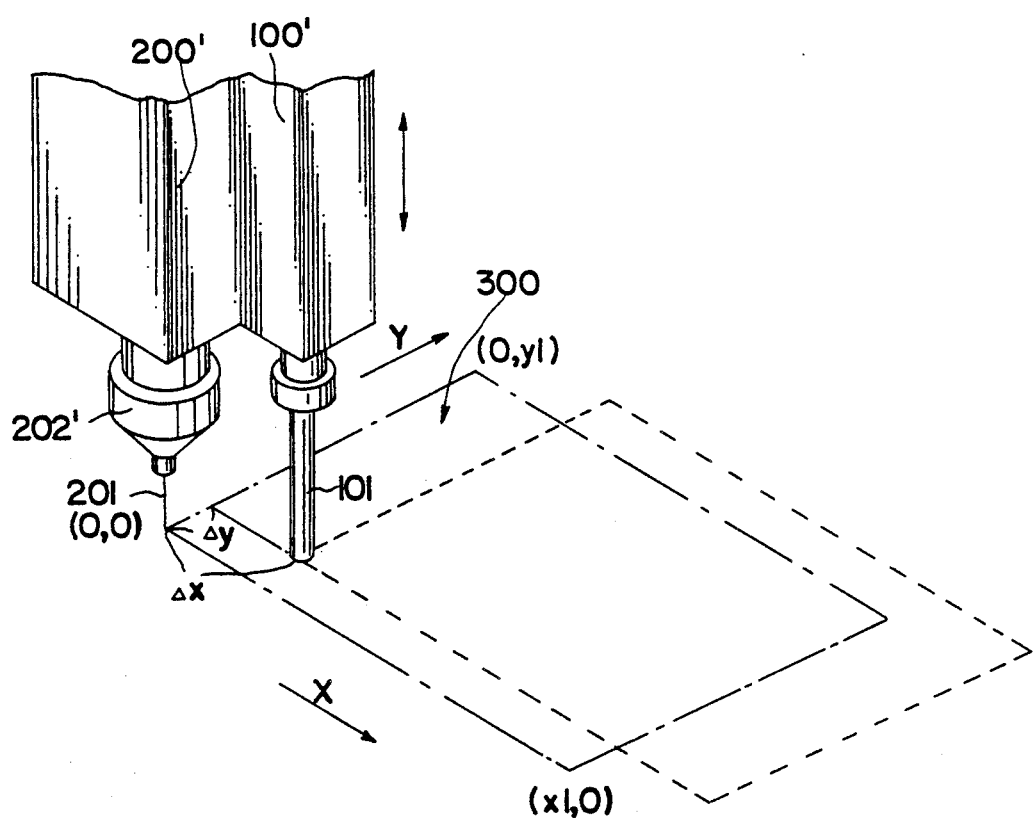
FIG. 2 is a schematic fragmentary perspective view whowing part of a wire-cut electric discharge machine to which a conventional initial hole machining device is mounted, and an electric discharge machining region and an initial hole machining region of the electric discharge machine.

First, a conventional initial hole machining device will be described with reference to FIG. 2 before the explanation of an initial hole machining device according to the present invention. An initial hole machining device 100' includes a pipe electrode 101 for initial hole machining, which is connected by a lead wire (not shown) to an electric power feeder (not shown) electrically connecting between an electric discharge machining power supply (not shown) of an electric discharge machine 200' and a wire electrode 201. In this device, after the pipe electrode 101 is positioned relative to a workpiece 300, an electric discharge is produced between the pipe electrode and the workpiece to make an initial hole (not shown). The pipe electrode 101 is located in a position horizontally offset from the wire electrode 201 extending through an upper wire guide 202' of the electric discharge machine 200', and is vertically movable relative to the electric discharge machine 200'. In an electric discharge machining process, a table (not shown) on which the workpiece 300 is placed is moved horizontally relative to the wire electrode 201 while an electric discharge is produced between the wire electrode and the workpiece, thereby to effect electric discharge machining.

Let it be assumed that an X-Y coordinate system is set on a horizontal plane on which the workpiece 300 is positioned and has its origin set at the intersection of the wire electrode 201 and the workpiece 300, where the offset amounts of the pipe electrode 101 in the X-axis and Y-axis directions with respect to the wire electrode 201 are expressed respectively by $\Delta X$ and $\Delta y$, and the electric discharge machinable region (x, y) of the wire electrode 201 is given by $0 \leq x \leq x1$ and $0 \leq y \leq y1$ in the X-axis and Y-axis directions, respectively (in the figure, the region is indicated by the chain line). The initial hole machinable region (x', y') of the pipe electrode 101 can then be expressed as $\Delta x \leq x' \leq x1 + \Delta x$ and $\Delta y \leq y' \leq y1 + \Delta y$ in the X-axis and Y-axis directions respectively (indicated by the dashed line in the figure). Thus, the region x", y") where both the initial hole machining process and the electric discharge machining process can be performed is given by $\Delta x \leq x" \leq x1$ and $\Delta y \leq y" \leq y1$ in the X-axis and Y-axis directions, respectively (indicated by the hatching in the figure), and hence the remaining region can be said to be a dead zone.

In the case of performing initial hole machining wherein the position command data for table position control representing a machining position is given by the use of the same coordinate system as the machine coordinate system set in the electric discharge machine for the electric discharge machining process, the position command data must be corrected in accordance with the offset amounts mentioned above. On the other hand, if common position command data is used for both the initial hole machining process and the electric discharge machining process, then the machine coordinate system must be altered in accordance with the offset amounts.

Moreover, the use of the lead wire between the pipe electrode and the electric power feeder causes an increase of the inductance of the initial hole machining power supply system. As a result, the characteristics of the electric discharge machining power supply are degraded, and thus the initial hole machining efficiency is lowered, due to an increased rise time of the initial hole machining pulse, for example.

Figure 1:
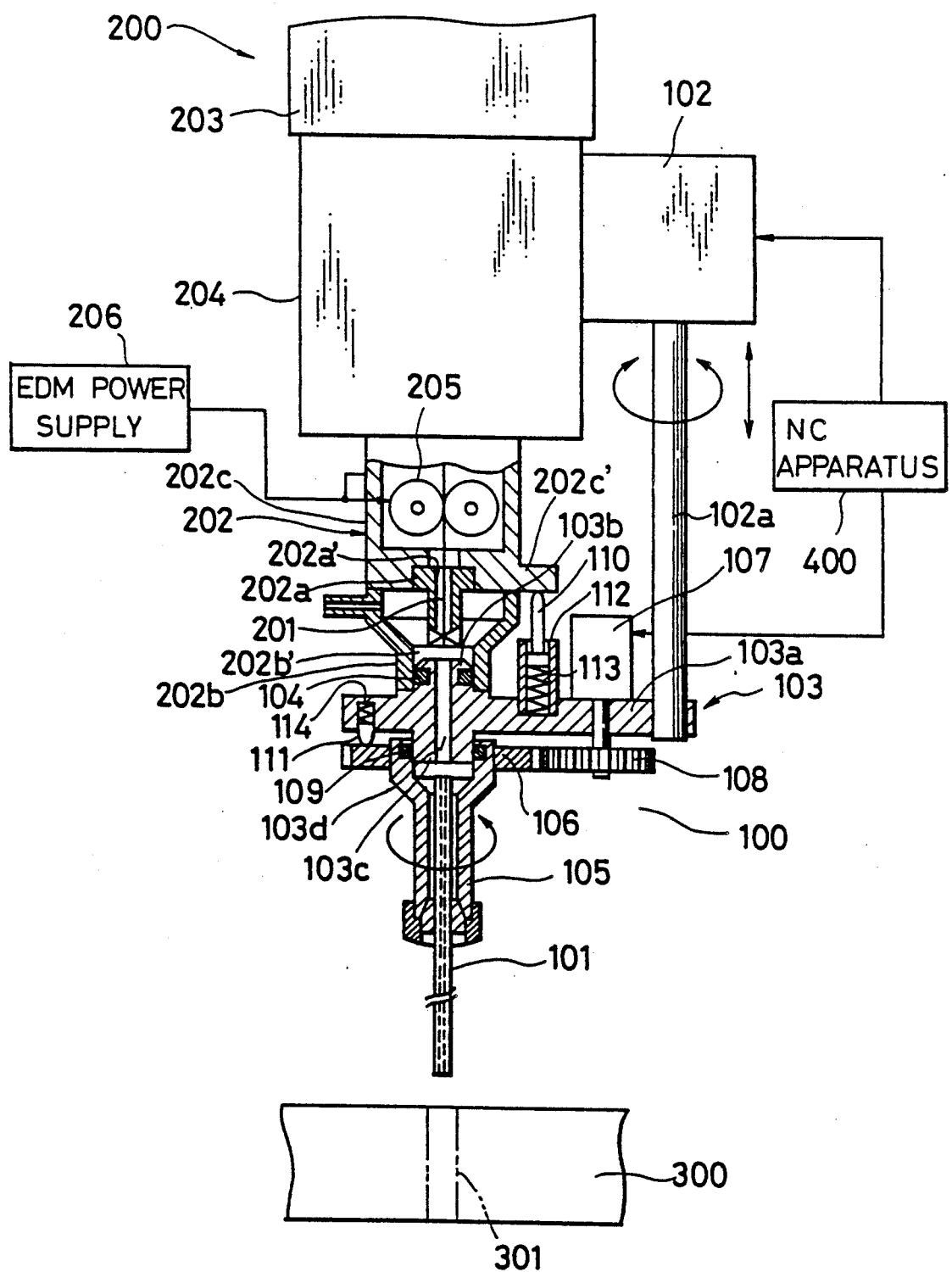
FIG. 1 is a schematic side view, partly in section, of a principal part of a wire-cut electric discharge machine to which is mounted an initial hole machining device according to an embodiment of the present invention.

With reference to FIG. 1, a wire-cut electric discharge machine equipped with an initial hole machining device according to an embodiment of the invention will now be described. In FIG. 1, like reference numerals are used to denote like elements in FIG. 2.

An electric discharge machine 200 includes a vertical slider 203 movable along the height (Z-axis direction) thereof relative to a base frame, not shown. To the vertical slider 203 is mounted a horizontal slider 204 which is movable in the Z-axis direction together with the vertical slider 203 and also is movable horizontally (X-axis and Y-axis directions) relative to the vertical slider. An upper wire guide 202, which is mounted to the horizontal slider 204 for horizontal movement together therewith, comprises a guide portion 202a having a wire insertion hole 202a' and serving as a guide for the wire electrode 201, and a nozzle portion 202b having a nozzle hole 202b' in alignment with the wire insertion hole 202a' and connected to a machining liquid feed system, not shown. An electric power feeder 205, which is electrically connected to an electric discharge machining power supply 206, is arranged in the hollow portion of the upper wire guide 202 to supply electric power to the wire electrode 201.

An initial hole machining device 100 includes a drive unit 102 mounted to the horizontal slider 204 and movable in the horizontal directions together therewith. The drive unit 102 is connected to a numerical control apparatus 400 for controlling various operations of the electric discharge machine 200, such that its drive shaft 102a may be moved in the Z-axis direction and rotated about the axis thereof under the control of the numerical control apparatus. The distal end of the drive shaft 102a is coupled to one side portion 103a of the body 103 of the initial hole machining device such that the body 103 can be moved in unison with the drive shaft. An upper protuberance 103b protrudes from the upper surface of the body 103 to be removably fitted in the nozzle hole 202b', and a lower protuberance 103c is formed on the lower surface of the body. A machining liquid passage 103d is bored through the body 103 and extends in the thickness direction thereof between the upper and lower protuberances, to be connected to the nozzle hole 202b'. In the peripheral surface of the upper protuberance 103b is formed an annular groove in which an O ring 104 is fitted to prevent leakage of a machining liquid.

A collet chuck 105 is removably coupled at its proximal end to the lower protuberance 102c of the body 103 of the initial hole machining device, in such a manner that the chuck 105 is rotatable but axially immovable relative to the body 103. The chuck serves to support the initial hole machining pipe electrode 101 coaxially with the wire electrode 201 and removable therefrom. A gear 106 is fitted around the proximal end portion of the chuck 105 to be rotatable with the chuck and meshes with a gear 108, which is fixed to the output shaft of a motor 107 secured to the side portion 103a of the body 103 and connected to the numerical control apparatus 400 to be controlled thereby. The chuck 105 has a hollow portion communicating with the machining liquid passage 103d, and an annular groove formed in the inner peripheral surface of the proximal end portion thereof to receive an O ring 109 for preventing leakage of the machining liquid.

To establish the electrical connection between the pipe electrode 101 and the electric discharge machining power supply 206, the shortest possible lead wire is used to electrically connect the body 202c of the upper wire guide 202 to the electric discharge machining power supply 206; while the body 202c of the upper wire guide, the body 103 of the initial hole machining device, the gear 106, and the collet chuck 105 are made of a good conductor. Furthermore, contact pieces 110 and 111 are arranged between the body 202c of the upper wire guide and the body 103 of the initial hole machining device and between the body 103 and the gear 106, respectively, for electrical connection. The contact piece 110 is slidably received in a cylinder 112 made of a good conductor and secured to the upper surface of the body 103, and is always urged outward by a spring 113 arranged in the cylinder so as to be abutted against a horizontal projection 202c' of the upper wire guide body 202c. The cylinder 112 has a stopper, not shown, which prevents the contact piece 110 from slipping off the cylinder. The other contact piece 111 is slidably fitted in a blind hole bored in the lower surface of the body 103 and is always urged by a spring 114 in the hole to be abutted against one end face of the gear 106.

The wire-cut electric discharge machine of FIG. 1 is equipped with a table drive mechanism for driving a table, on which the workpiece 300 is mounted, in the horizontal (X and Y axes) directions, a lower wire guide, a wire conveyor device, an automatic wire extension device, various sensor means, and other devices like a conventional machine, though illustration and description of them are omitted.

The operation of the wire-cut electric discharge machine constructed as above will be described.

When the initial hole machining process is not carried out, for example, when an ordinary electric discharge machining process is performed, the body 103 of the initial hole machining device, as well as the pipe electrode 101 and the elements that move together with the body 103, are held in a set-aside position (not illustrated) so as not to hinder the electric discharge machining process or the like.

At the start of the initial hole machining process, the drive unit 102 is actuated by the numerical control apparatus 400. First, the drive shaft 102a of the unit is lowered over a predetermined stroke and then rotated about its axis approximately by 90 degrees. As the drive shaft 102a rotates, the body 103 of the initial hole machining device turns about the shaft 102a to a position where the upper protuberance 103b of the body is situated just under the nozzle hole 202b' of the upper wire guide 202. Subsequently, the drive unit 102 moves the drive shaft 102a upward over the above-mentioned predetermined stroke. As a result, the initial hole machining device is set in an initial hole machining position (FIG. 1) in which the contact piece 110 having its distal end abutted against the horizontal projection 202c' of the upper wire guide body 202c is pushed back in the cylinder 112 against the force of the spring 113 and in which the upper protuberance 103b of the body 103 is fitted in the nozzle hole 202b'. In this initial hole machining position, the pipe electrode 101 is electrically connected to the electric discharge machining power supply 206 by the collet chuck 105, the gear 106, the contact piece 111, the body 103 of the initial hole machining device, the cylinder 112, the contact piece 110 and the upper wire guide body 202c, all made of a good conductor. The hollow portion of the collet chuck 105, which contains part of the pipe electrode 101, is connected to the machining liquid feed system through the machining liquid passage 103d of the body 103 and the nozzle hole 202b' of the upper wire guide 202.

Next, the numerical control apparatus 400 drives the above-mentioned table drive mechanism (not shown) to move the workpiece 300 in the X-axis and Y-axis directions, so as to locate the pipe electrode 101 to a desired initial hole-forming position on the workpiece 300. Since the pipe electrode 101 is disposed coaxially with the wire electrode 201, it can be set in any desired position within the electric discharge machinable region of the wire electrode 201 on the workpiece 300, which region is determined by the mechanical structure of the electric discharge machine. In other words, hno dead zone is present. Furthermore, the position for the initial hole machining process coincides with that for the ordinary electric discharge machining process, and therefore, the position command data based on the machine coordinate system common to both the initial hole machining and the ordinary electric discharge machining has only to be delivered from the numerical control apparatus 400 to the horizontal slider 204. Thus, neither conversion of the machine coordinate system nor correction of the position command data is required for carrying out the initial hole machining.

Subsequently, the electric discharge machining power supply 206, the machining liquid feed system and the motor 107 are turned on, and the vertical slider 203 is moved in the Z-axis direction toward the workpiece 300 at a predetermined rate. Specifically, the pipe electrode 101 is driven by the motor 107 through the gears 108 and 106 and the chuck 105 to rotate about the axis thereof, and simultaneously is moved toward the workpiece 300 by the vertical slider 203 through the horizontal slider 204 arranged for movement in unison therewith, the drive unit shaft 102a, the body 103, and the chuck 105, with the upper wire guide 202 moved toward the workpiece together with the sliders 203, 204. At this time, an electric discharge is produced between the pipe electrode and the workpiece and a machining liquid is supplied to this discharge area from the machining liquid feed system, so that an initial hole 301 is formed by degrees. In this process, electric power is supplied from the electric discharge machining power supply 206 to the pipe electrode 101 through a power supply route having a smaller inductance than lead wires, i.e., through the collet chuck 105, the gear 106, the contact piece 111, the body 103 of the initial hole machining device, the cylinder 112, the contact piece 110, and the upper wire guide body 202c. Therefore, the characteristics of the electric discharge machining power supply 206 are not degraded, thus ensuring highly efficient initial hole machining. The machining liquid, on the other hand, is supplied to the electric discharge machining region through the nozzle portion 202b of the upper wire guide 202, the machining liquid passage 103d of the initial hole machining device body 103, and the hollow portion of the collet chuck 105; that is, the machining liquid is fed along a course almost identical with the course taken during the ordinary electric discharge machining process, thus making it unnecessary to provide a separate machining liquid feeding device for the initial hole machining process only.

At the end of the initial hole machining process, the numerical control apparatus 400 stops actuating the vertical slider 203 and the motor 107 upon receiving an output signal from sensor means of a conventionally known type representing the end of the machining. Then, the vertical slider 203 is moved upward over a distance corresponding to the length of the initial hole, and the drive unit 102 is driven to lower its drive shaft 102a over the predetermined stroke such that the upper protuberance 103b of the body 103 of the initial hole machining device is detached from the nozzle hole 202b' of the upper wire guide 202. Thereafter, the drive shaft 102a is rotated and then moved upward, thereby setting the initial hole machining device 100 in the set-aside position.

After the initial hole machining process, a wire extension process is carried out using the initial hole made in the aforementioned manner, followed by the electric discharge machining process. The wire extension process and the electric discharge machining process are performed in the same manner as in the conventional machine, and therefore description thereof is omitted.

I claim:

1. An initial hole machining device for use in a wire-cut electric discharge machine having a wire guide for guiding a wire electrode, comprising:
   a body detachably mounted to said wire guide,
   wherein said body is movable perpendicular to said wire electrode between a first initial hole machining position in which said body is mounted to said wire guide coaxial with the wire electrode, and a second set-aside position in which said body is spaced from said wire guide;
   an initial hole machining electrode connected to said body; and
   means for moving said body and initial hole machining electrode between the first position and the second position.

2. The initial hole machining device according to claim 1, wherein said moving means includes drive means operatively coupled to said body for moving the body and initial hole machining electrode between said first initial hole machining position and said second set aside, spaced position.

3. The initial hole machining device according to claim 1, wherein said wire guide includes a nozzle portion having a nozzle hole for feeding a machining liquid, said body being arranged to be detachably positioned in said nozzle hole and having a machining liquid passage communicating with said nozzle hole.

4. The initial hole machining device according to claim 1, wherein said wire-cut electric discharge machine includes an electric discharge machining power supply, said initial hole machining device including means for electrically connecting said initial hole machining electrode to said electric discharge machining power supply, said electrically connecting means having a small inductance.

* * * * *